United States Patent [19]

Hanamura et al.

[11] Patent Number: 4,678,736
[45] Date of Patent: Jul. 7, 1987

[54] OPTICAL RECORDING MEDIA ON WHICH INFORMATION IS STORED AND METHOD OF MAKING SAME

[75] Inventors: Eiichi Hanamura; Yoshinori Tokura, both of Tokyo; Akio Takada, Tokyo; Akira Itsubo, Mie, Japan

[73] Assignee: Mitsubishi Petrochemical Co., Ltd., Tokyo, Japan

[21] Appl. No.: 835,183

[22] Filed: Mar. 3, 1986

[30] Foreign Application Priority Data

Mar. 5, 1985 [JP] Japan ................................ 60-043886
Mar. 5, 1985 [JP] Japan ................................ 60-043887
Mar. 5, 1985 [JP] Japan ................................ 60-043888

[51] Int. Cl.$^4$ ...................... G01D 15/14; G01D 15/34
[52] U.S. Cl. .................................. 430/270; 430/945; 430/21; 346/1.1; 346/135.1; 369/16
[58] Field of Search ............... 430/270, 945, 21; 346/1.1, 135.1; 369/16

[56] References Cited

U.S. PATENT DOCUMENTS 4,208,501  6/1980  Yee et al. ............................. 430/80
4,515,429  5/1985  Smith et al. ...................... 350/96.13

Primary Examiner—Alexander S. Thomas
Attorney, Agent, or Firm—Donald D. Mon

[57] ABSTRACT

Optical recording media for storing information on which bits are formed by applying radiant energy to a polydiacetylene thin film supported by a substrate, so that the main chain structure of the polydiacetylene is transformed into another form or forms. The optical recording media has the advantages of allowing high-speed recording both with small amounts of energy for recording and with high recording density.

16 Claims, 13 Drawing Figures

(A) ACETYLENE-TYPE    (B) BUTATRIENE-TYPE (A) ACETYLENE-TYPE   (B) BUTATRIENE-TYPE

OPTICAL RECORDING MEDIA ON WHICH INFORMATION IS STORED AND METHOD OF MAKING SAME

FIELD OF THE INVENTION

This invention relates to optical recording media, and more particularly to optical recording media on which bits can be formed with radiant energy, and both recording of information with high recording density and optical reading can be performed, and to a method of making the same.

BACKGROUND OF THE INVENTION

Apparatus in which both recording of and optical reading of information with high recording density can be performed, and their technique is known. As methods of recording information on optical recording media, there are two kinds of methods. In one method, pits corresponding to bits are formed by applying radiant energy to a recording media. In the other method, domains with different optical characteristics, such as reflection factor, absorption coefficient, refractive index are formed corresponding to bits by applying radiant energy to a recording media.

In the former, radiant energy causes thin films, such as metal on a base, to partially melt or vaporize, so that pits are formed in the recording media. In the latter, radiant energy causes the phase transition of a thin film on a base, or radiant energy causes a change of bonding between atoms so that domains with different optical characteristics are formed. This invention relates to the latter method.

Optical recording media in which recording can be performed by a change of optical characteristic generally should have the following characteristics:

(i) High-speed recording can be performed with a small amount of energy for recording, (ii) Recording with high recording density can be performed, (iii) Optical contrast of recorded parts to unrecorded parts is large, (iv) Rewriting can be performed, (v) Media material is a stability allowing both long-time preservation and long use possible, and (vi) The media material is not toxic or dangerous.

Optical recording media which are known to this date are as follows.

(i) Thin films which consists of low melting point metal, such as Te, Se, or of an alloy of the said low melting point metals, (ii) Thin films which consists of a metallic compound, such as TeOx, (iii) Organic thin films which consist of dyes, such as fluorecein, cyanine, or pigment, and (iv) Thin films which consist of photochromic compounds.

As to organic media, many kinds of materials such as the heat-mode type or media material of the photon-mode type are proposed. However, they have disadvantages, for example: Sensitivity is insufficient, contrast of the recorded part to the unrecorded part is small, and it is difficult to make the S/N (signal to noise) ratio higher, further, the stability after recording is insufficient.

Therefore, they are practically unsatisfactory. On the other hand, as to inorganic media, many kinds of materials are proposed. One practice was to provide a light disc memory of the additional record type (DRAW type) which is made by Te system compounds, such as Te-C and TeOx. Further, recently, research has been made actively into light disc memory of the rewriting type (E-DRAW type), for example, in light disc memories in which the phase transition between crystal and non-crystal TeOx is utilized for recording.

However, when the phase transition between crystal and non-crystal TeOx is utilized for recording, the reflection factor of the unrecorded part is about 15% to 20%, while that of the recorded part is about 30% to 40%. The difference between both is about 15% to 20%, which is insufficient. Further, when the phase transition is utilized for recording, there is a limit to making the recording speed higher. Furthermore, Te system media have a problem that makes it desirable to lower the toxicity of said media or to detoxicate it.

It is strongly desired to develop recording media in which the characteristics (i) to (v) as stated above are improved, to make the capacity higher, and to decrease error ratio by making the S/N ratio higher on a full scale.

Accordingly, it is an object of the present invention to provide an organic optical recording media in which bits are formed at high speed and with high recording density, and with large optical contrast of the recorded part to the unrecorded part.

In this invention, the word "optical recording" signifies both recording with radiant energy rays and reading optically recorded information. Therefore, the word "optical recording media" signifies media in which information is recorded in such manner that optical reading can be performed.

The recording media according to this invention has the following advantages:

(i) High-speed recording can be performed in a period of less than 10 nsec, (ii) Recording can be performed with low energy of less than about 80 mJ/cm$^2$, (iii) Recording can be performed with high recording density greater than $10^8$ bits/cm$^2$, either in the binary system or in the n-system, (iv) Optical contrast of the recorded part to the unrecorded part is large, so that the error ratio can be lowered advantageously, and (v) Recording media has no toxicity.

BRIEF DESCRIPTION OF THE INVENTION

The inventors have found that bits can be formed by utilizing a change of the main chain structure of polydiacetylene which is caused by application of radiant energy to the polydiacetylene, and have completed this invention on the basis of the above-mentioned knowledge.

DETAILED DESCRIPTION

Figure 1:
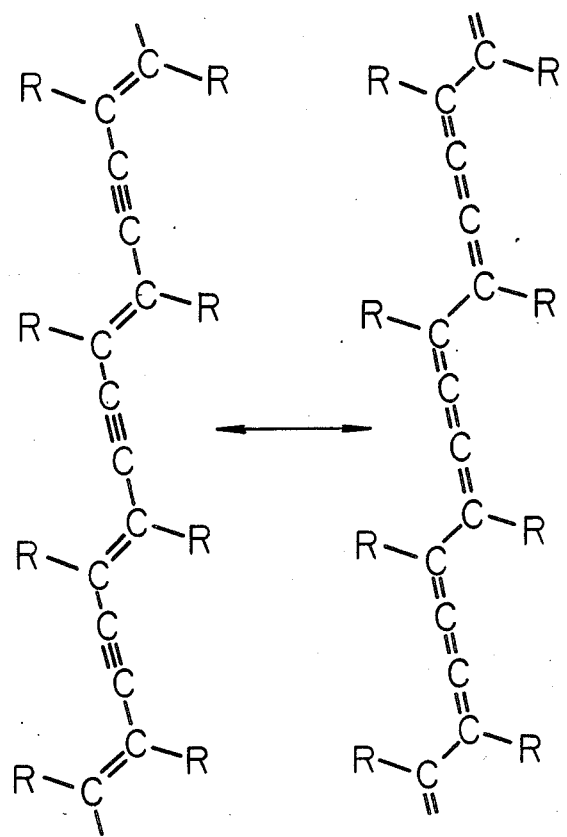
FIG. 1 is an explanatory view showing the structural formula of acetylene-type bonding and butatriene-type bonding.

In this invention, as a main chain structure of polydiacetylene, A-type bonding and B-type bonding exist. It is presumed that A-type bonding is acetylene bonding, while B-type bonding is butatriene bonding (see FIG. 1).

Furthermore, it is presumed that for each type bonding, planar configuration and a non-planar configuration exist.

In this invention, it is presumed that optical recording can be performed mainly with a change of the main chain structure between A-type bonding and B-type bonding, and additionally with a change of structure between planar configuration and non-planar configuration.

Recording media according to this invention can be formed as recording media which can be utilized as additional record type (DRAW type) and rewriting type (E-DRAW type).

Polydiacetylene, polydiacetylene thin film, conversion of the main chain structure, absorption and reflection spectra of polydiacetylene, application of radiant energy on polydiacetylene, recording, and reading will be explained in order as follows.

Polydiacetylene

In this invention, as polydiacetylene, polymers of a diacetylene monomer can be employed which include all polymers in which a change of the main chain structure is caused by application of radiant energy to the polymers.

Herein, the word "diacetylene monomer" is a generic name of both compounds, having conjugated diacetylene bonding and their derivatives.

As polydiacetylene, polymers of diacetylene monomer can be preferably employed which have, in a side chain, acids, such as carboxylic acid, sulfonic acid, their esters, amides and salts, alcohols and their carboxylic ester, sulfonic ester, sulfinic ester, isocyanic ester, or carbamic ester, hydrocarbon, phenyl, or heterocyclic compound. For example, a polymer of a diacetylene monomer cn be employed which has the general formula:

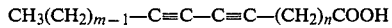

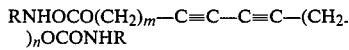

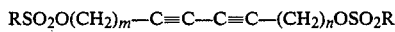

wherein substituent R has no limits within the determined substituents.

In this invention, as polydiacetylene, a copolymer of over two different diacetylene monomers, or a blended polymer of over two different polydiacetylene can be employed. Further a mixture of the above polydiacetylene and a photo sensitizer or the like can be employed.

Polydiacetylene thin film

In this invention, polydiacetylene thin film can be formed by the methods mentioned below.

The diacetylene monomer is deposited, in a state of thin film on a substrate by a vacuum deposition method, Langmuir-Blodgett's technique, and coating method. Then, diacetylene monomer is polymerized with heat, light, gamma rays, and the like. Among these methods, particularly, the vacuum deposition method is preferable as it is easy to deposited polydiacetylene finely and uniformly. It is both advantageous to the formation of bits and very useful for the improvement of recording density to form finely and uniformly deposited polydiacetylene. The thickness is usually 100 Å (Angstroms) to 10 μm (micrometers). However, there are no limits to the thickness.

Substrate

When optical energy is employed for recording, as a substrate, transparent material which has transparency suitable for the light wave characteristic of the desired source of light can be employed, as the sensitivity can be improved. Herein, the standard of the transparency can be set up at transmittance of incident rays of over 90%. As such substrates, there are materials in form of disc, tape, film or sheet, which are made up of inorganic material such as glass or of organic material such as polyester, polycarbonate, polyvinyl chloride, polyamide, polystyrene, polymethyl methacrylate, and the like, and their modified polymers, copolymer and blended polymer. On the other hand, when recording is performed by applying radiant energy for recording on the substrate from the reverse side of the substrate, the substrate's base material in which coloring matter, dye, pigment, reinforcing agent, and the like are added to the above-mentioned inorganic or organic materials can be employed. Further, a metalic plate of aluminum alloy or the like, can be employed.

Vacuum deposition

Vacuum deposition can be performed by heating diacetylene monomer in a boat under pressure of less than 10 Torr, preferably less than $10^{-1}$ Torr. The temperature can be selected according to the selected monomer. However, generally, a heating temperature a little above the melting point is appropriate. In case of sublimate material, heating can be performed also at a temperature less than the melting point. There are no limits in both material of the boat and heating method. Generally, as a heating method, resistance heating, high-frequency heating, or electron beam can be employed, and as a boat, a boat made up of high melting point metal, such as tungsten, molybdenum, niobium, or their alloys can be employed. The speed of vacuum deposition can be selected by necessity. However, the speed of 20 Å/min to 50,000 Å/min can be generally employed.

Langmuir-Blodgett's Technique

The method of making mono-molecular film and method of accumulating these mono-molecular films are based on the general method mentioned in "New Empirical Chemistry Course", edited by Japan Chemical Society, Vol. 18th, Surface and Colloid, Chapter 6, published from Maruzen Co.

An apparatus, such as a microbalance of the float type can be desirably used. As a water, it is desirable to use water which is obtained by treating the water with ion-exchange material and potassium permanganate for removal of organic compounds and thereafter distilling the above treated water. The water temperature is desirably 15° C. to 20° C. An ion, such as $Cd^{++}$ of $10^{-3}$ mol/l to $10^{-4}$ mol/l is added as necessary to the water. Purified diacetylene monomer is dissolved in chloroform for spectroscopic analysis. Its concentration is 0.5 mg/ml of 1.0 mg/ml. After monomolecular films are formed, mono-molecular films are accumulated one after another on the substrate, under a surface pressure kept between 20 $dyn/cm^2$ and 25 $dyn/cm^2$.

Coating method

A solution or suspension of a diacetylene monomer is applied to the substrate, by a coating method, such as spray coating, spin coating, or the like. Herein, there are no limits in both solvents and its concentration. Taking both fine-ness and uniformity of thin film into consideration, it is desirable to use a solvent with high solubility. Typical solvents are ketones such as acetone, or methyl ethyl ketone, halides such as chloroform, or methylene chloride, esters such as ethyl acetate, amides such as dimethyl acetamide, dimethyl formamide, or N-methyl-2-pyrrolidone and nitriles such as acetonitrile.

Polymerizing Method

Heat, light, gamma rays, or the like are applied on the obtained thin film of diacetylene monomer and the diacetylene monomer is polymerized in a solid phase to form a polydiacetylene thin film. In this invention, it is possible to laminate a protective layer on the polydiacetylene, or to laminate two sheets.

Transformation of the Main Chain Structure

As a main chain structure, there are bonding structures such as A-type bonding and B-type bonding (FIG. 1). Further, it is presumed that for each type, stereoconfigurations such as planar configuration, and non-planar configurations exist.

The main chain structure is identified by absorption spectrum, reflection spectrum, resonance Raman spectrum, X ray diffraction, or the like (Gregory J. Exarhos et al, J.A.C.S., 98 481 (1976)).

Hitherto, about the change between A-type bonding and B-type bonding, it was reported that the bonding structure of TCDU single crystal, wherein the side chain is

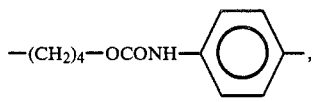

changes from B-type bonding to A-type bonding by stress imposed on the TCDU single crystal (H. Müller at al., Mol. Cryst. Liq. Cryst., 45, 313 (1978)), and that ETCD single crystal, wherein side chain is $-(CH_2)_4-OCONH-C_2H_5$, has A-type bonding below about 70° C., B-type bonding above about 120° C., and thermo hysteresis between about 70° C. and 120° C. (R. R. Chance et al., J. Chem., Phys., 67, 3616 (1977)).

The inventors have found that the main chain structure can be transformated into another form at high speed by applying radiant energy with minute diameter having a small amount of energy on the polydiacetylene thin film, and the degree of transformation of the main chain structure can be controlled, and that these transformation could be detected as a change of optical characteristics of spectrum such as absorption spectrum (transmission spectrum), reflection spectrum, and the like.

Furthermore, the inventors have found that minute bits with diameter less than 1.0 μm which had large differences of optical contrast to the circumference and whose boundary was distinct could be formed both with small amount of energy, at high-speed, and with high recording density, by using the above-mentioned knowledge.

For example, in the case of applying on the substrate a pulsed oscillating laser (excimer-laser or dye-laser) with a pulse duration of 10 nsec, bits could be formed both with a small amount of energy less than about 80 $mJ/cm^2$, and at a high speed of less than 10 nsec and with a high recording density of more than $10^8$ $bit/cm^2$.

Absorption and reflection spectra

Figure 2:
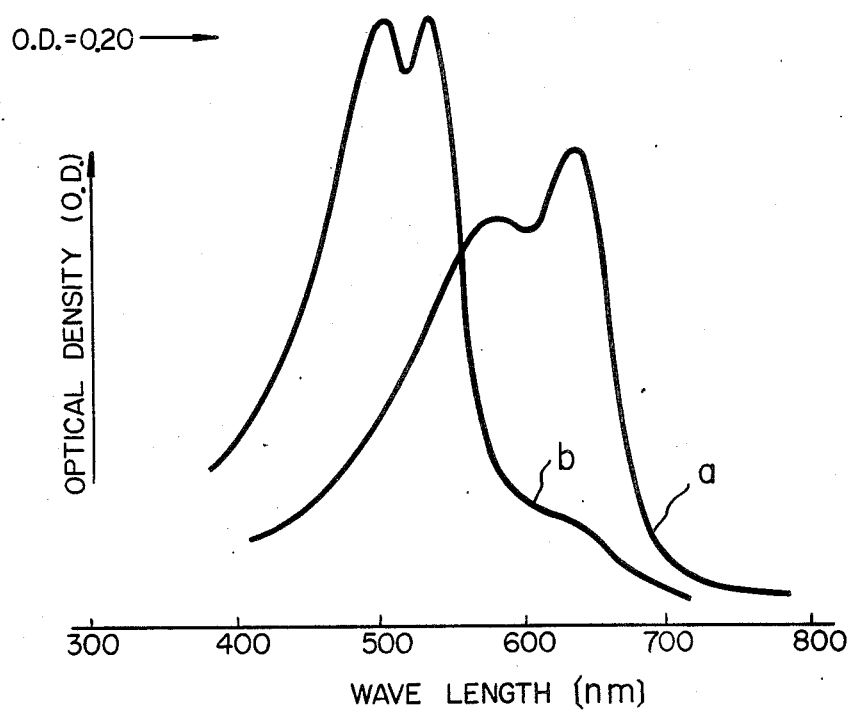
FIG. 2 is a graph of the absorption spectrum obtained in example 1.

As shown in FIG. 2, between the ultraviolet region and near infrared region, the absorption spectrum of A-type bonding of polydiacetylene has a peak in the neighbourhood of 638 nm, while absorption spectrum of B-type bonding of the same has a peak in the neighbourhood of 535 nm.

The difference between these peaks is about 103 nm, a large difference. The overlap of both spectra is small. Therefore, a change of optical contrast (absorption or reflection coefficient) caused by the transformation between A-type bonding and B-type bonding is extremely large, which is extremely advantageous for the improvement of the S/N ratio in both recording and reading. As to reflection spectrum, the same thing can be said.

Absorption and reflection spectra of other main chain structures can also be measured in the same way.

Application of rays on the polydiacetylene

As radiant energy for recording, rays with wave lengths in the ultraviolet region, or in the visible region, or in the region of over near-infrared region rays can be employed.

For the ultraviolet region, rays with a wave length under 400 nm, preferably of 200 nm to 380 nm can be employed. The shorter the wave length is, the more effectively a change of the main chain structure comes about.

For the visible region, rays with a wave length more than 400 nm and under 720 nm can be employed.

For rays with a wave length of the region over near-infrared rays region, rays with a wave length of 720 nm to 12 μm, preferably 720 nm to 2.0 μm can be employed.

As radiant energy for reading, rays with a wave length over the spectrum on the side of the short wave length of spectrum of B-type bonding, and below the spectrum on the side of the long wave length of the spectrum of A-type bonding can be employed, and are preferably from 300 to 850 nm.

The amount of irradiation energy is not restricted, and is preferably from 1 mJ/cm$^2$ to $1 \times 10^3$ J/cm$^2$.

As a source of light, a laser with an oscillating wave length is the ultraviolet region, visible region, over near-infrared rays region, such as an Ar laser, a He-Ne laser, a He-Cd laser, a dye laser, a semiconductor laser, or lamps such as xenon flash lamps can be employed.

Further, as a source of light, either continuous oscillating light (CW), or pulsed light can be used. The source of light used is preferably a pulse oscillating ray, particularly preferably a pulse oscillating ray with a pulse width less than 1.0 μsec. When a pulse oscillating ray is used, it is possible to convert the main chain structure by the irradiation of rays with the small amount of energy. In the case of continuous oscillating light (CW), it is desirable to irradiate with rays at high strength for a short time.

Method of recording information

Radiant energy with certain minute diameters which energy is modulated corresponding to information are applied on the polydiacetylene thin film to form bits with widths or diameters less than about 1.0 μm. Thus it can perform a recording of a code information or an image information. Herein, the word "code information" signifies information in which characters, figures, programs, and the like are converted into bits, which have a different optical characteristic with each other corresponding to a "1", and "0" (in case of the binary system). The word "image information" signifies information in the form of an image. As image information, there are two kinds of information. One is image information which is recorded in an analog signal in the same manner as a video disc, wherein information is recorded on the light disc as intervals between bits. The other is image information which is recorded in digital signal through a line-sensor in a manner such as a facsimile signal.

[Recording of n-system]n≧3

The amount of irradiation energy in the radiant beam is controlled to n kinds of different values by varying the irradiation time with the constant light power, or by varying the light power with the constant irradiation time, and the controlled radiant energy is applied to the polydiacetylene. Thus the main chain structure is transformed into n kinds of states, for example, (A-type bonding, (A−B)-type mixed bonding (1), (A−B)-type mixed bonding (2), . . . , (A−B)-type mixed bonding (n−2), B-type bonding) to form n kinds of bits which have different optical characteristic with one another to the extent that reading is possible. Thus information is recorded in the n-system. In the 4-system, (for example, A-type bonding, (A−B)-type mixed bonding (1), (A−B)-type mixed bonding (2), and B-type bonding respectively correspond to "0", "1","2", and "3" and form bits. Generally in the binary system, $2^8=256$ characters and figures which can be coded with 8 bits. On the other hand, in the 4-system, $4^4=256$ characters and figures which can be coded with 4 bits. Therefore, it is possible to obtain a recording density twice as great as the binary system. Thus the recording density can be improved with the n-system.

Recording in the binary system

The amount of irradiation energy of the energy beam is controlled to two values, and irradiated, so that the main structure is transformed into two kinds of states, such as [A-type bonding, B-type bonding]), [A-type bonding, (A−B)-type mixed bonding (n−1)], [(A−B)-type mixed bonding (1), (A−B)-type mixed bonding (n−2)], [(A−B)-type mixed bonding (1), B-type bonding]. In this way two kinds of bits are formed, which have a different optical characteristic with each other to the extent that reading is possible. Thus information is recorded in the binary system.

Rewriting

Eliminating information and rewriting can be done by utilizing formation of n kinds of bits which have different optical characteristic from one another to the extent sufficient for reading.

In the case of the binary system, information is recorded by forming two kinds of bits which are composed of, for example, A-type bonding and (A−B)-type mixed bonding (1), respectively corresponding to "0" and "1". Then, rays which have sufficient energy to form (A−B)-type mixed bonding (1) are irradiated on the recording media, so that all bits are converted into (A−B)-type mixed bonding (1), whereby the recorded information is eliminated. Then, new information is recorded by forming two kinds of bits which are composed of (A−B)-type mixed bonding (1) and (A−B)-type mixed bonding (2). Hereafter, in the same way, rewritings of (n−1) times are possible.

Reading

The recorded information can be read out through a change of optical characteristics by supplying radiant energy having a wave length of about 0.5 μm to 2.5 μm.

EXAMPLES

Example 1

A diacetylene monomer, pentacosa-10,12-diynoic acid [$CH_3-(CH_2)_{11}-C\equiv C-C\equiv C-(CH_2)_8-COOH$] was used. LB film was formed as follows with a built-up film forming apparatus of the float type. Water was used which was obtained by treating water with ion-exchange material and potassium permanganate for removal of organic compounds and theeafter subjecting the treated water two times to distillation.

Water temperature was set at 15° C.±0.1° C. $CdCl_2$ was dissolved in the water which concentration is $1 \times 10^4$ mol/l, and thus pH was set at 6.1. The purified diacetylene monomer was dissolved in chloroform for spectroscopic analysis which concentration is 0.7 mg/ml. As a substrate, quartz glass was used which was cleaned with both sulfuric acid and the above-mentioned water. The monomolecular film was formed on the surface of the water, in which the substrate was dipped with the surface pressure kept at 25 dyne/cm. Monomolecular films of 40 layers were accumulated one after another on the substrate so that a Y-typed LB film of diacetylene monomer with both an area of about 20 mm by 20 mm and a thickness of about 1000 Å was formed. Ultraviolet rays of 240 nm to 400 nm which were obtained with both a high pressure mercury-vapor lamp and a band pass filter (UV-D33S) were applied on the diacetylene monomer LB film with 5 mW/cm$^2$ for 40 minutes, so that the diacetylene momomer was polymerized to form polydiacetylene thin film.

Figure 3:
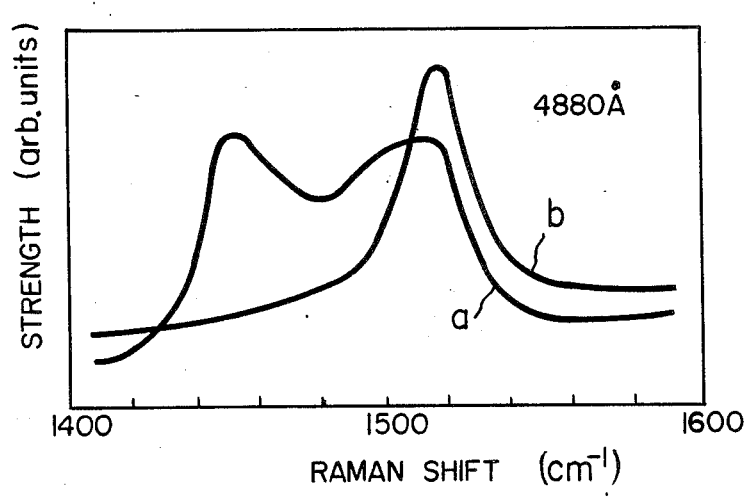
FIG. 3 is a graph of the resonance Raman scattering spectrum obtained in example 1.

The absorption spectrum and the resonance Raman spectrum of this polydiacetylene is shown by line a in FIGS. 2 and 3. It was found from the form of spectra and the wave length regions that this polydiacetylene had A-type bonding containing a very small amount of B-type bonding.

Then, ultraviolet rays of 240 nm to 400 nm were applied on the polydiacetylene thin film layer. The absorption spectrum and the Raman scattering spectrum of the polydiacetylene on which energy of $1 \times 10^2$ joule/cm$^2$ was applied are shown by line b in FIGS. 2 and 3.

It was found from the form of spectra and wave length regions that the polydiacetylene was transformed almost completely into B-type bonding.

Figure 4:
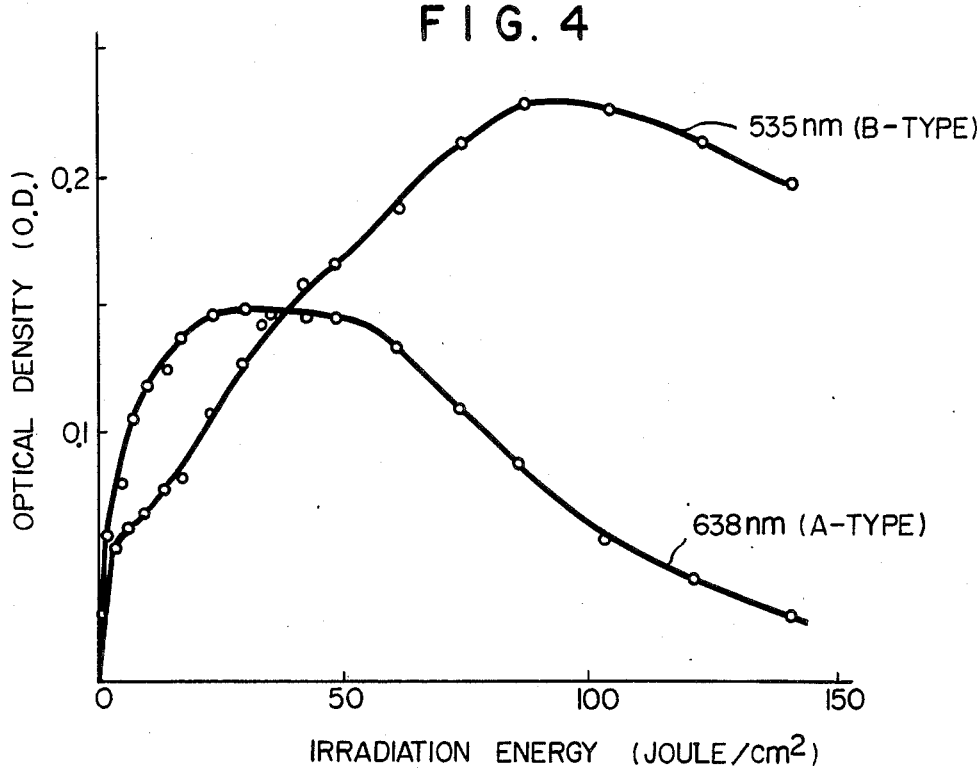
FIG. 4 is a graph showing a state of change of A-type bonding into B-type bonding caused by the irradiation energy obtained in example 1.

A change of absorption coefficient to the irradiation energy at the wave length (638 nm) corresponding to a peak of the absorption spectrum of A-type bonding and a change of absorption coefficient to the irradiation energy at the wave length (535 nm) corresponding to a peak of the absorption spectrum of B-type bonding are shown in FIG. 4. A change of A-type bonding into B-type bonding depends on irradiation energy.

The change of main chain structure began at $3.0 \times 10$ joule/cm$^2$ and ended at $1.5 \times 10^2$ joule/cm$^2$. Herein, a change of optical density in case of 638 nm was 0.15 to 0.01 and a change of optical density in case of 535 nm was 0.13 to 0.23. When ultraviolet rays of 250 nm irradiated the polydiacetylene, a change in the main chain structure began at 2.0 joule/cm$^2$, and ended at $1.0 \times 10$ joule/cm$^2$.

Furthermore, when ultraviolet rays of 302 nm were irradiated on one area of polydiacetylene film and ultraviolet ray of 365 nm were irradiated on the other area, the efficiency of transformation from A to B in case of 302 nm was $6 \times 10^{-3}$ on the basis of a change in case of 250 nm (as this change $=1$), while the efficiency in case of 365 nm was $8 \times 10^{-5}$. The shorter the wave length, the better the efficiency was. Thus it was found that it was possible to control the degree of change between A-type bonding into B-type bonding (mixing ratio) and that the transformation of A-type bonding into B-type bonding depends on the wave length. When fine beams of ultraviolet rays (240 nm to 400 nm) were applied on the polydiacetylene, distinct bits were formed which were composed of regions with a width of about 1.0 $\mu$m transformed into B-type bonding.

EXAMPLE 2

Figure 5:
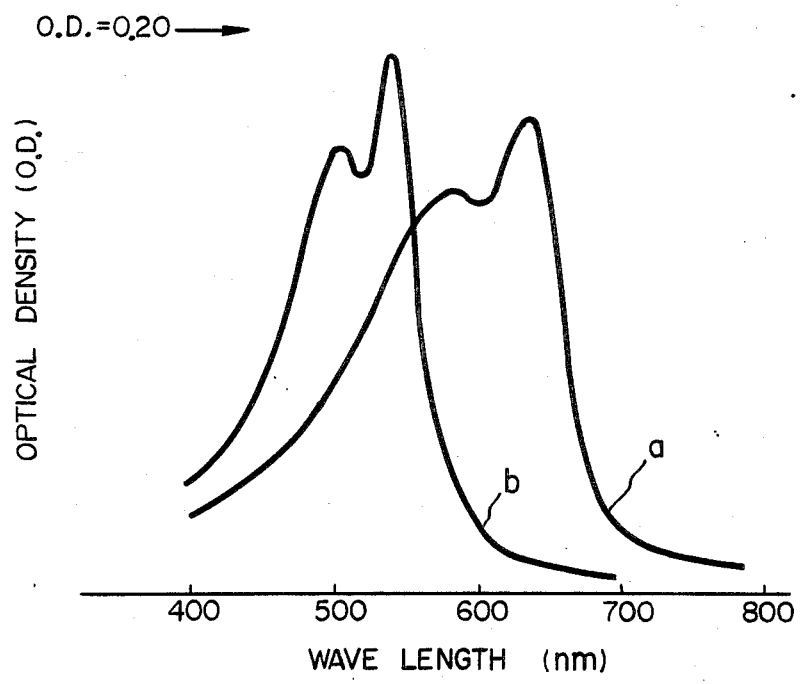
FIG. 5 is a graph of the absorption spectrum obtained in example 2.

In the same way as example 1, a polydiacetylene thin film layer was formed which was a polymer of diacetylene monomer LB film of pentacosa-B 10,12-diynoic acid [CH$_3$—(CH$_2$)$_{11}$—C≡CC≡C—(CH$_2$)$_8$—COOH]. This polydiacetylene was A-type bonding as shown with line a in FIG. 5.

An Ar laser (488 nm) was applied to the polydiacetylene thin film. It was found from the absorption spectrum shown with line b in FIG. 5 that the polydiacetylene thin film on which energy of $1 \times 10^2$ W/cm$^2$ was irradiated showed transformation of A-type bonding into B-type bonding. When fine beams of the Ar laser (CW, 5145 Å) were used to irradiate, distinct bits were formed which were composed of regions with a width of about 1.0 $\mu$m transformed into B-type bonding.

EXAMPLE 3

As a diacetylene monomer, pentacosa-10,12-diynoic acid (CH$_3$—(CH$_2$)$_{11}$—C≡C—C≡C—(CH$_2$)$_8$—COOH] was used. Vacuum deposited film of the diacetylene monomer was formed with a vacuum deposition apparatus as follows. About 50 mg of the diacetylene monomer was put in a molybdenum boat, and resistance heating was done under pressure of $2 \times 10^{-5}$ at 80° C., so that vacuum deposited film of the diacetylene monomer with a thickness of 1.0 $\mu$m was formed on a quartz glass which had an area of 25 mm by 25 mm. Ultraviolet rays (240 to 400 nm) which were obtained with both a high pressure mercury vapor lamp and a band pass filter (UV-D33S) was applied on the vacuum deposited film of diacetylene monomer with 20 mW/cm$^2$ and for 30 minutes, so that the diacetylene monomer was polymerized to form a polydiacetylene thin film layer. The absorption spectrum and the resonance Raman spectrum of this polydiacetylene are shown by line a in FIGS. 6 and 7. It was found that this polydiacetylene had A-type bonding containing a very small amount of B-type bonding.

Figure 7:
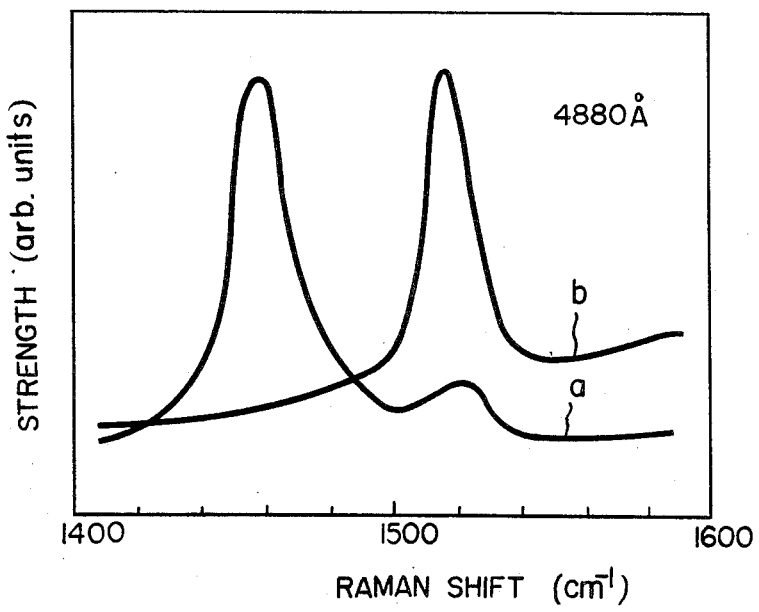
FIG. 7 is a graph of the resonance Raman scattering spectrum obtained in Example 3.
Figure 8:
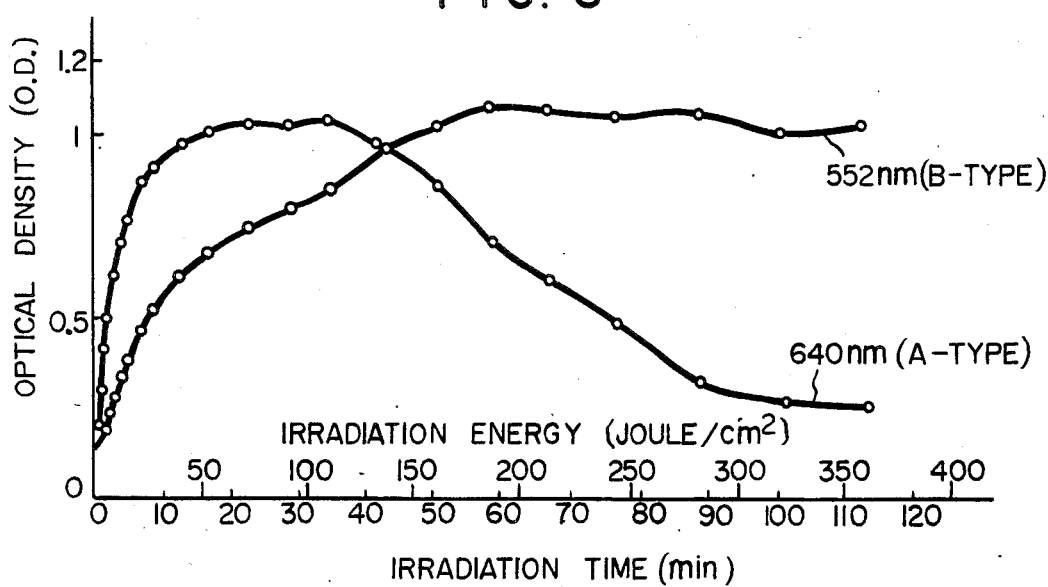
FIG. 8 is a graph showing a state of a change of A-type bonding into B-type bonding caused by the irradiation energy obtained in example 3.

Then, the ultraviolet rays (240 nm to 400 nm) were applied on the polydiacetylene thin film. It was found as shown by line b in FIGS. 6 and 7 that the polydiacetylene was converted almost entirely into B-type bonding. It was found that transformation of A-type bonding into B-type bonding depends on the irradiation energy in the same manner as FIG. 4. Transformation of the main chain structure began at $7.0 \times 10$ joule/cm$^2$, and ended at $2.6 \times 10^2$ joule/cm$^2$ (FIG. 8). Herein a change of optical density in case of 640 nm was 1.1 to 0.2, while a change of optical density in case of 552 nm was 0.6 to 1.1. When fine beams of ultraviolet rays (240 nm to 400 nm) were applied on the polydiacetylene, distinct bits were formed which were composed of regions with a width of about 1.0 $\mu$m.

EXAMPLE 4

Figure 9:
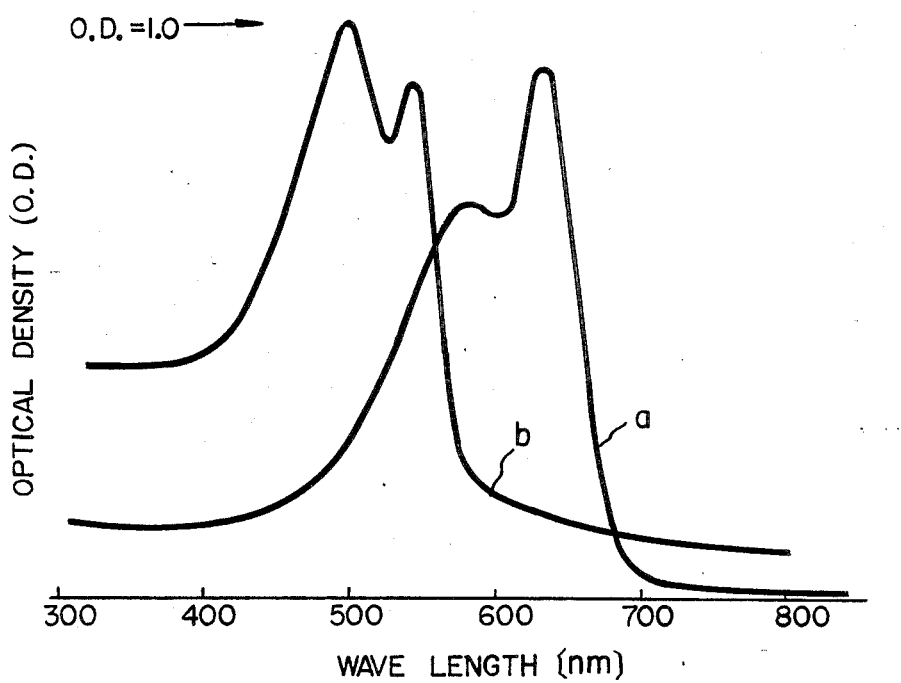
FIG. 9 is a graph of the absorption spectrum obtained in example 4.

In the same way as example 3, a polydiacetylene thin film layer was formed by polymerizing vacuum coating film of pentacosa-10,12-diynoic acid (CH$_3$—(CH$_2$)$_{11}$—C≡C—C≡C—(CH$_2$)$_8$—COOH]. It was found as shown with line a in FIG. 9 that this polydiacetylene had an A-type bonding containing a very small amount of B-type bonding.

Ar laser rays (CW, 488 nm) were applied on the polydiacetylene thin film layer. The polydiacetylene on which energy of $1 \times 10$ W/cm$^2$ was applied showed transformation of A-type bonding into B-type bonding. As shown by line b in FIG. 9, the change of optical density was 0.52. When Ar laser rays (5145 Å) were applied on the polydiacetylene thin film layer, distinct bits were formed which were composed of regions with a width of about 1.0 $\mu$m transformed into B-type bonding.

EXAMPLE 5

In the same way as example 3, polydiacetylene thin film layer was formed by polymerizing vacuum deposited film of pentacosa-10,12-diynoic acid (CH$_3$—(CH$_2$)$_{11}$—C≡C—C≡C—(CH$_2$)$_8$—COOH].

Figure 10:
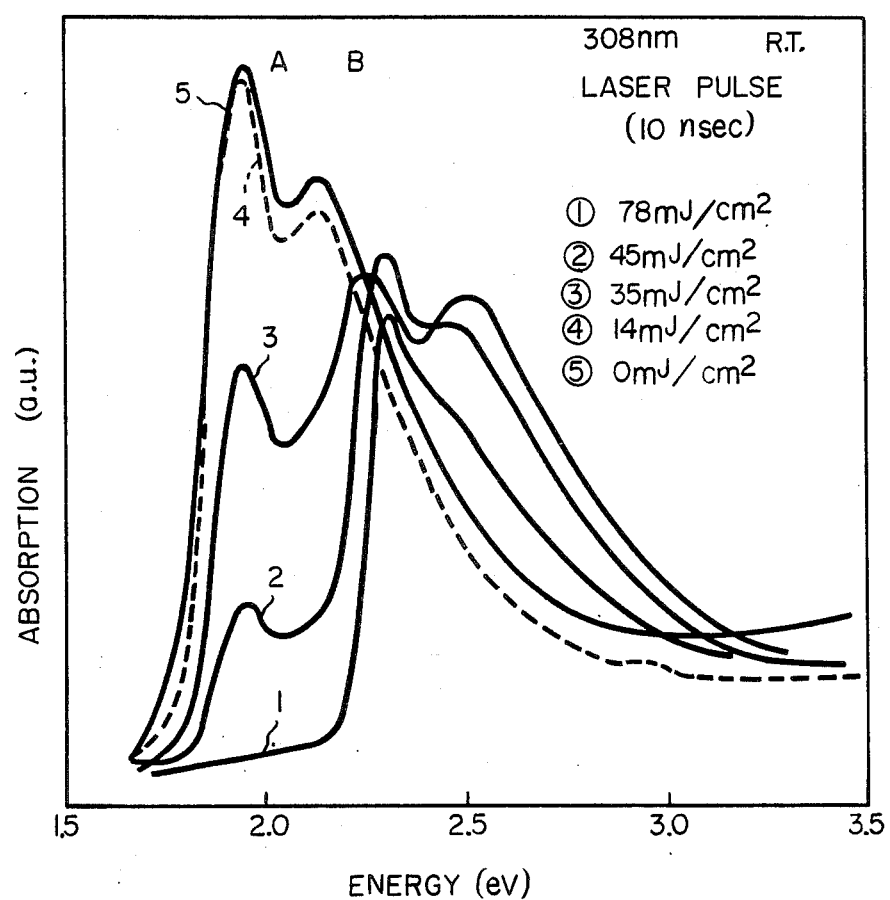
FIGS. 10 and 11 are graphs of the absorption spectrum obtained in example 5.

Then, using pulsed oscillating rays of an excimer laser, (wave length of 308 nm, pulse width of 10 nsec, and 1 shot), energy of different amount of 0, 14, 35, 45 and 78 mJ/cm$^2$ was applied to the polydiacetylene thin film layer. It was found that conversion of A-type bonding into B-type bonding depended on the amount of energy which was applied to the polydiacetylene, as shown in FIG. 10.

Figure 11:
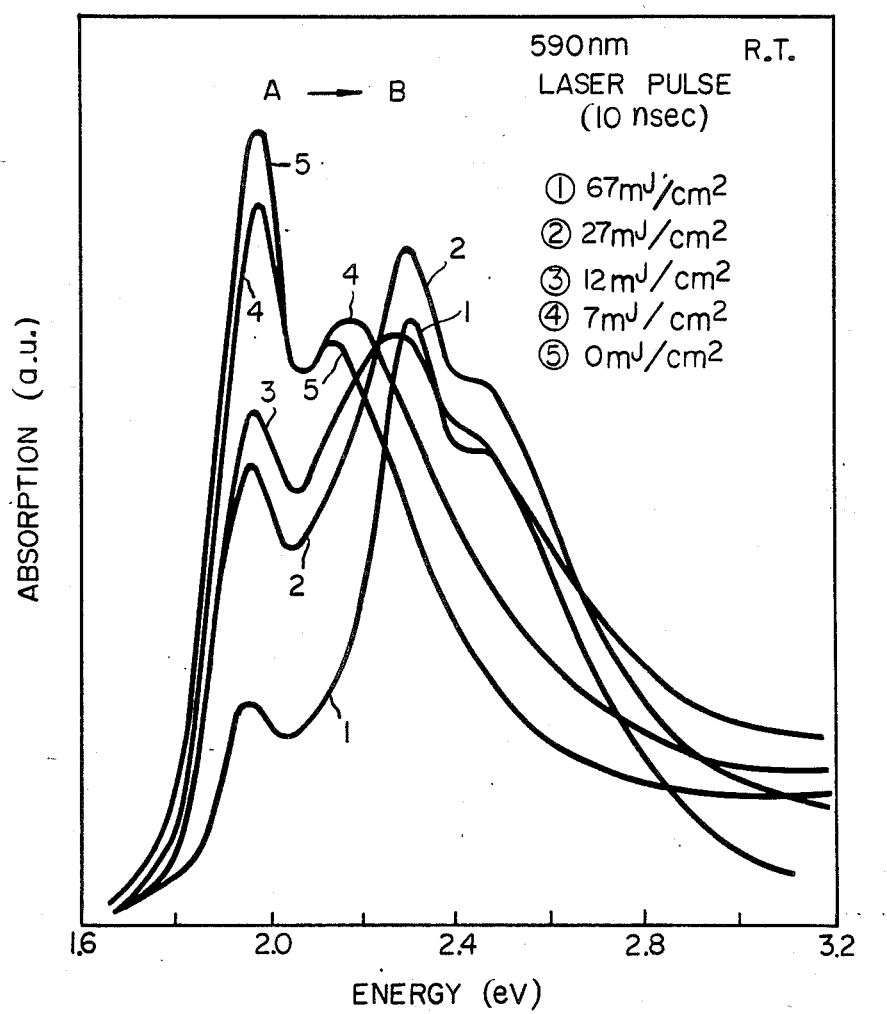

Furthermore, using the pulse oscillating ray of a dye laser (excimer laser excitation, wave length of 590 nm, pulse width of 10 nsec, and 1 shot), energy of different amounts of 0, 7, 12, 27 and 67 mJ/cm$^2$ was applied on the polydiacetylene. It was found that conversion of A-type bonding into B-type bonding depends on the amount of energy which was applied on the polydiacetylene film layer, as shown in FIG. 11.

From the above-mentioned matters, it was found that the amount of energy required for recording was less than 70 to 80 mJ/cm$^2$. Furthermore, it was found that transformation of A-type bonding was into B-type bonding completed extremely quickly in a period of less than 10 nsec.

EXAMPLE 6

As diacetylene monomer, 5,7-dodecadiyn-1,12-diol-bisethylurethane $(CH_3-CH_2-NHOCO(CH_2)_4-C\equiv C-C\equiv C-(CH_2)_4OCONH-CH_2-CH_3)$ (ETCD) was used. A vacuum deposited film of the diacetylene monomer was formed with vacuum deposition apparatus as follows. About 40 mg of the diacetylene monomer was put in the molybdenum boat, and heated at 140° C., and under the pressure of $2\times10^{-6}$ Torr, with resistance-heating, and evaporated on quartz glass with an area of 25 cm by 25 cm to form a vacuum deposited film of a diacetylene monomer with a thickness of 0.9 μm. Then, ultraviolet rays of 240 nm to 400 nm obtained with both a high pressure mercury-vapor lamp and a band pass filter (UV-D33S) were applied on the vacuum deposited film of the diacetylene monomer so that the diacetylene monomer was polymerized to form polydiacetylene thin film.

Figure 12:
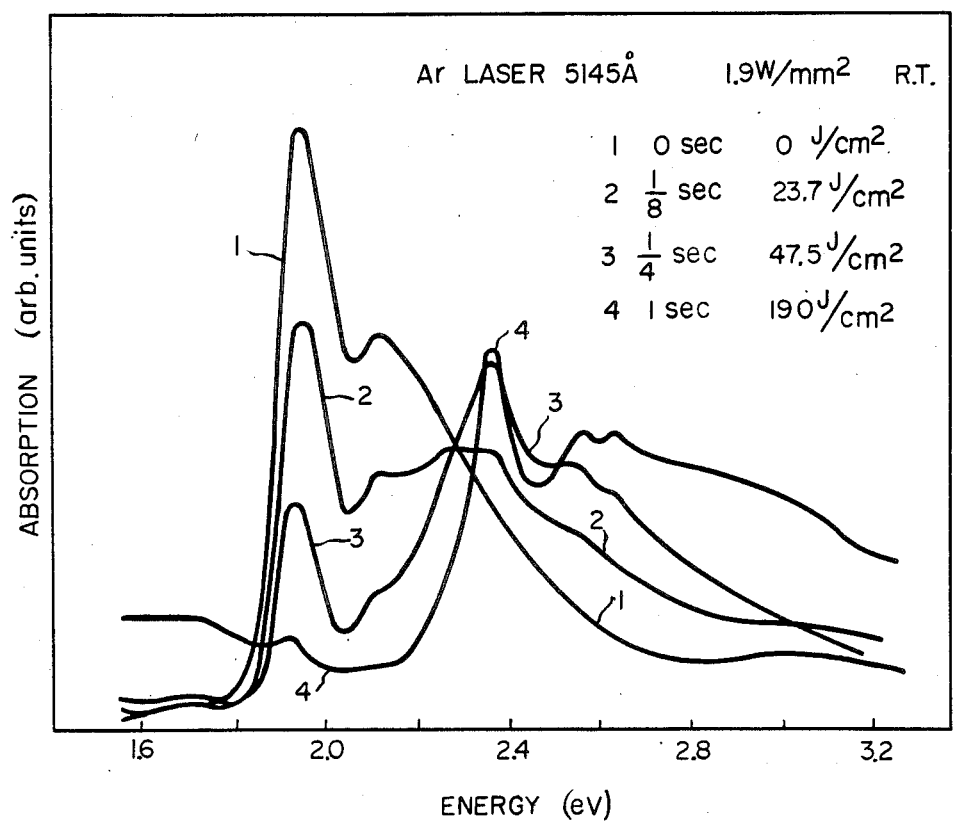
FIGS. 12 and 13 are graphs of the absorption spectrum obtained in example 6.
Figure 13:
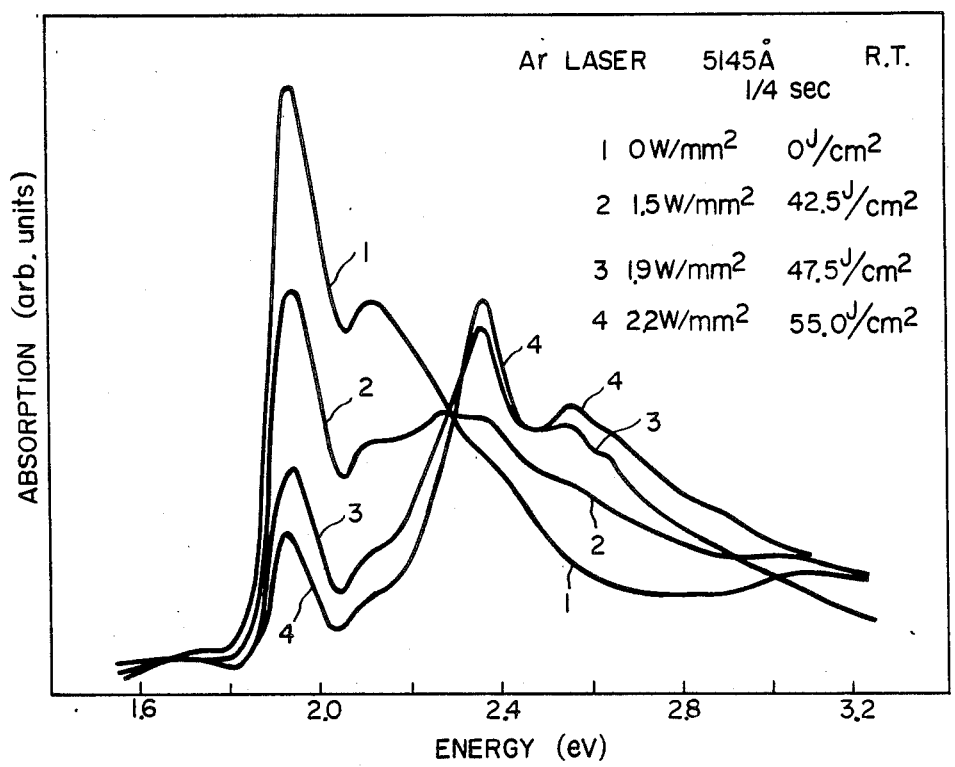

Then, Ar laser rays (CW, 5145 Å) with a constant irradiation power (1.9 W/mm$^2$), and for various irradiation periods of 0, ⅛, ¼ and 1 sec were applied on the polydiacetylene thin film layer so that the transformation of A-type bonding into B-type bonding appeared depending upon the irradiation energy, as shown in FIG. 12.

Then, Ar laser rays (CW, 5145 Å) for constant irradiation periods and with various irradiation power of 0, 1.5, 1.9 and 2.2 W/mm$^2$ were applied to the polydiacetylene thin film so that transformation of A-type bonding into B-type bonding depended upon the irradiation energy. As with the above-mentioned matters, it was found that it was effective to apply Ar laser rays with strong irradiation power for short periods on the polydiacetylene monomer. However, for the vacuum deposited film of ETCD, differing from mono-crystal, the hysteresis of temperature between A-type bonding the B-type bonding was not recognized.

When fine beams of an Ar laser ray (CW, 5145 Å) were applied on the polydiacetylene thin film layer, distinct bits were formed as regions with a width of about 1.0 μm.

EXAMPLE 7

As diacetylene monomer, 5,7-dodecadinye-1,12-diol-bisphenylurethane

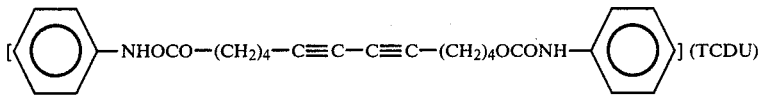

Figure 6:
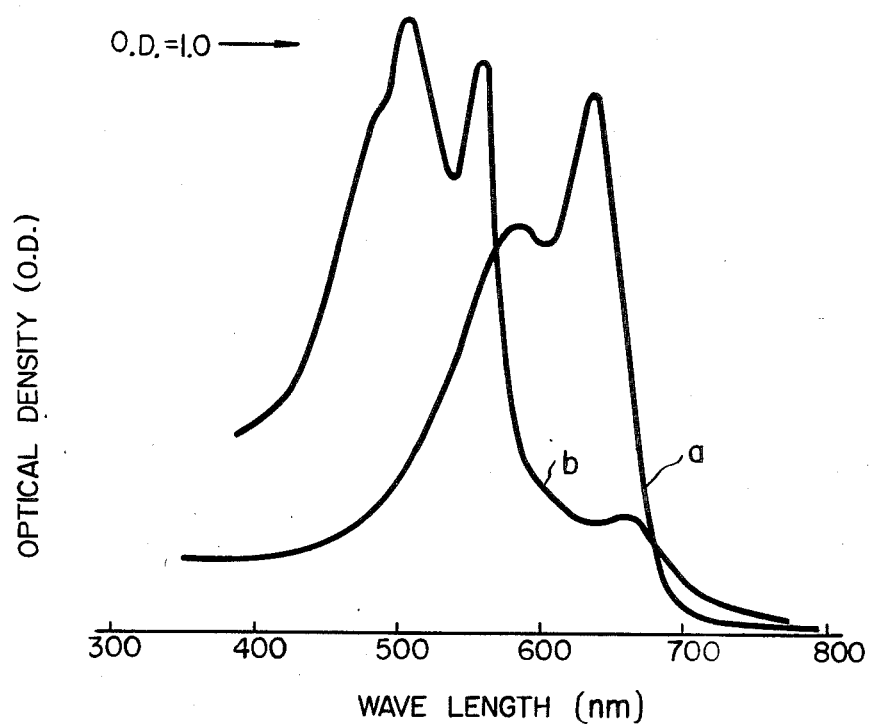
FIG. 6 is a graph of the absorption spectrum obtained in example 3.

(TCDU)

was used, and in the same way as FIGS. 3 and 6, polydiacetylene thin film layer was formed by a vacuum deposition method.

Then, in the same way as example 5, the pulse oscillating rays of a dye laser (excimer laser excitation, a wave length of 590 nm, a pulse width of 10 nsec, and 1 shot) was applied on the polydiacetylene, transformation of A-type bonding into B-type bonding appeared with a low energy of about 80 mJ/cm$^2$ and at the high-speed of less than 10 nsec. However, the vacuum deposited film of TCDU, differing from mono-crystal, had A-type bonding until beams of a dye laser were applied on the TCDU.

We claim:

1. A method of making an optical recorded media for storing information optically comprising; forming a polydiacetylene thin film on a substrate; irradiating said polydiacetylene thin film with beams of radiant energy having minute diameters, said beams of radiant energy being modulated to represent information being recorded; whereby the structure of said polydiacetylene thin film is transformed to represent bits in which the information is recorded.

2. The method according to claim 1 wherein said polydiacetylene thin film is formed by vacuum deposition of a polymer of diacetylene monomer.

3. The method according to claim 1 in which said polydiacetylene thin film is formed of a polymer of diacetylene monomer LB film by Langmuir-Blodgett's technique.

4. The method according to claim 1 in which controlling said beams of radiant energy comprises; controlling the amount of radiant energy to produce different values; said different values being equal to or greater than two; applying said controlled beams of radiant energy to said polydiacetylene thin film to produce transformations equal to the number of different values of said radiating beam; whereby information bits are formed by the number of different values of the radiating beam.

5. The method according to claim 4 wherein the beams of radiant energy have a wavelength greater than approximately 200 nanometers and less than approximately 400 nanometers.

6. The method according to claim 4 wherein the beams of radiant energy have a wavelength greater than approximately 400 nanometers and less than approximately 720 nanometers.

7. The method according to claim 4 wherein the beams of radiant energy have a wavelength between approximately 720 nanometers and approximately 12 micrometers.

8. The method according to claim 1 wherein said beam of radiant energy is a pulsed beam of radiant energy.

9. Optical recording media homing information optically stored comprising; a substrate; a thin film comprised of polydiacetylene film supported by said substrate; information bits formed on said polydiacetylene thin film by application of modulated radiant energy of minute diameter to optically store information; said polydiacetylene thin film being transformed by said radiant energy.

10. Optical recording media according to claim 9 wherein said polydiacetylene thin film comprises; a polymer of a diacetylene monomer; said polymer of diacetylene monomer having a side chain selected from the group consisting of; carboxylic acid, sulfonic acid, and their esters, amides and salts, alcohols and their carboxylic esters; sulfonic ester, sulfinic ester, isocyanic ester, and carbamic ester; hydrocarbon, phenyl, and heterocyclic compound.

11. Optical recording media according to claim 9 wherein said polydiacetylene thin film is comprised of; a thin film of a polymer of diacetylene monomer formed on said substrate by vacuum deposition.

12. Optical recording media according to claim 9 wherein said polydiacetylene thin film is comprised of; a polymer of diacetylene monomer LB film on said substrate formed by Langmuir-Blodgett's technique.

13. Optical recording media according to claim 9 wherein said polydiacetylene thin film is comprised of a polymer of diacetylene monomer film formed on said substrate by a coating method.

14. Optical recording media according to claim 9 wherein the thickness of said polydiacetylene thin film is approximately 100 angstroms to 10 nanometers.

15. Optical recording media according to claim 9 wherein said information bits comprise; n kinds of bits where n is equal to or greater than three; said information bits being formed by application of n types of radiant energy having irradiation energy different from one another to said polydiacetylene thin film; said polydiacetylene thin film being transformed into a main chain structure having n kinds of states whereby information is recorded and stored by said n kinds of bits.

16. Optical recording media according to claim 9 wherein said information bits comprise; two kinds of bits formed by application of two types of radiant energy having different irradiation energy from one another to said polydiacetylene thin film, said polydiacetylene thin film being transformed into a main chain structure having two states whereby information is recorded on and stored in a binary form.

* * * * *